United States Patent [19]

Lii

[11] Patent Number: 6,070,304
[45] Date of Patent: Jun. 6, 2000

[54] CABLE FOR CABLE TYING DEVICE

[76] Inventor: Yeon Shin Lii, No. 3, Dong Chien Lane, Gin Duen Tsuen, Hua Tan Hsiang, Chang Hua Hsien, Taiwan

[21] Appl. No.: 09/170,399

[22] Filed: Oct. 13, 1998

[51] Int. Cl.⁷ .................................................. B65D 63/10
[52] U.S. Cl. .................. 24/16 PB; 24/17 AP; 24/30.5 P
[58] Field of Search ................... 24/16 PB, 17 A, 24/17 AP, 30.5 P; 248/74.3

[56] References Cited

U.S. PATENT DOCUMENTS

| | | | |
|---|---|---|---|
| 4,573,242 | 3/1986 | Lankton et al. | 24/16 PB |
| 4,680,834 | 7/1987 | Andre et al. | 24/16 PB |
| 4,735,387 | 4/1988 | Hirano et al. | 24/16 PB X |
| 4,788,751 | 12/1988 | Shely et al. | 24/16 PB |
| 4,908,911 | 3/1990 | Bretti et al. | 24/16 PB |
| 5,687,456 | 11/1997 | Chang | 24/16 PB |
| 5,826,308 | 10/1998 | Chang | 24/16 PB |

*Primary Examiner*—James R. Brittain
*Assistant Examiner*—Robert J. Sandy

[57] ABSTRACT

A cable assembly for a cable tying device includes a cable having two or more rows of cavities arranged in a stagger way, and includes a tie head having two or more pairs of ratchet catches extended inward of a bore of the tie head. The pairs of ratchet catches each has one or more teeth arranged in a stagger way for engaging with the rows of cavities of the cable and for securing the cable to the tie head. The cable will not be easily disengaged or released from the tie head when only one or two of the ratchet catches are damaged or are disengaged from the tie head.

1 Claim, 2 Drawing Sheets

CABLE FOR CABLE TYING DEVICE

BACKGROUND OF THE INVENTION

1. Field of the Invention

The present invention relates to a cable, and more particularly to an improved cable assembly for a cable tying device.

2. Description of the Prior Art

Typical cable tying devices are provided for tying an object with a cable that has a number of holes formed in one surface and with a tie head for coupling the ends of the cable together. The cable may be disengaged from the tie head easily when a expanding or stretching force is applied against the cable. The tie head has no safety mechanisms provided for preventing the cable from being easily disengaged from the tie heads.

The present invention has arisen to mitigate and/or obviate the afore-described disadvantages of the conventional cables for cable tying devices.

SUMMARY OF THE INVENTION

The primary objective of the present invention is to provide an improved cable assembly having a safety mechanism for preventing the cable from being easily disengaged from the tie head.

In accordance with one aspect of the invention, there is provided a cable assembly for a cable tying device, the cable assembly comprising a cable including at least two rows of cavities formed therein, and a tie head including a bore formed therein and including at least two pairs of ratchet catches extended inward of the bore thereof, the pairs of ratchet catches each having at least one tooth for engaging with the rows of cavities of the cable and for securing the cable to the tie head.

The rows of cavities of the cable are arranged in a stagger way relative to each other, the pairs of ratchet catches are arranged in a stagger way corresponding to the rows of cavities of the cable for engaging with the rows of cavities of the cable.

The tie head includes a guide channel formed therein for slidably receiving the cable and for positioning the cable relative to the tie head.

The cable includes a first surface and an opposite surface, the rows of cavities are formed in the first surface of the cable.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
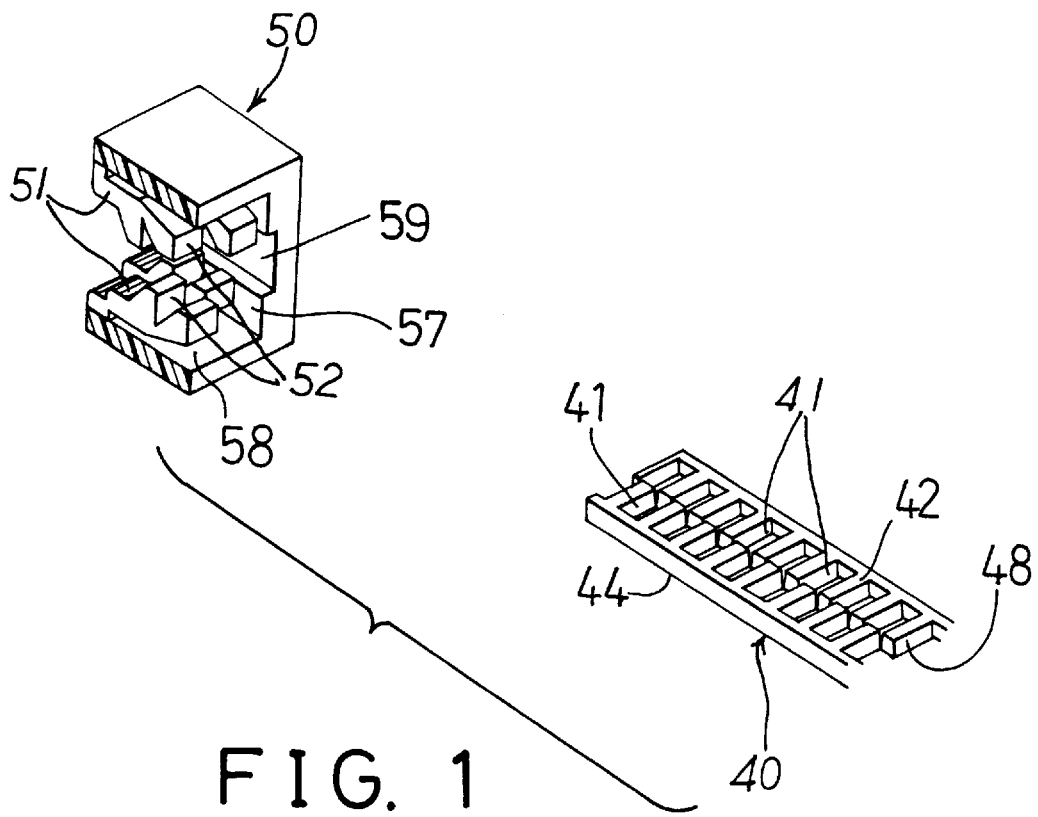
FIG. 1 is an exploded view of a cable assembly in accordance with the present invention, in which the cable assembly is seen from the bottom portion thereof, and a portion of the tie head is cut off for showing the inner structure of the tie head.
Figure 2:
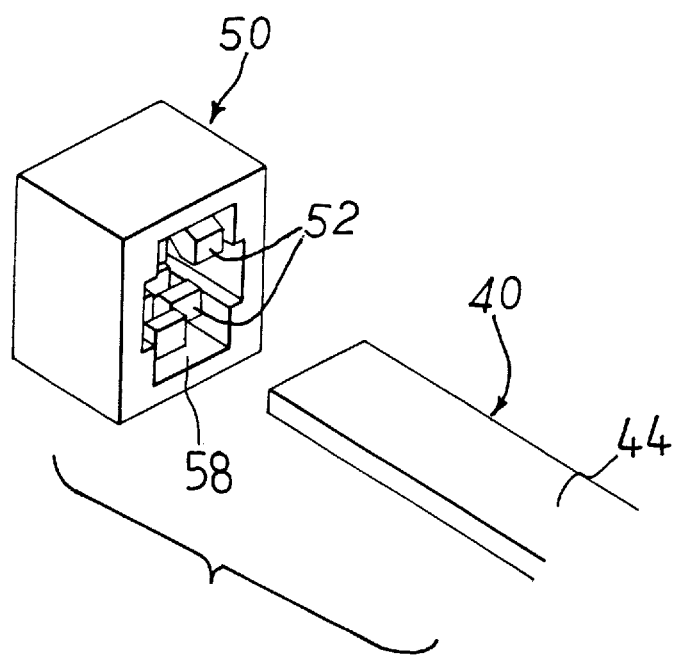
FIG. 2 is an exploded view of the cable assembly, in which the cable assembly is seen from the upper portion thereof.
Figure 3:
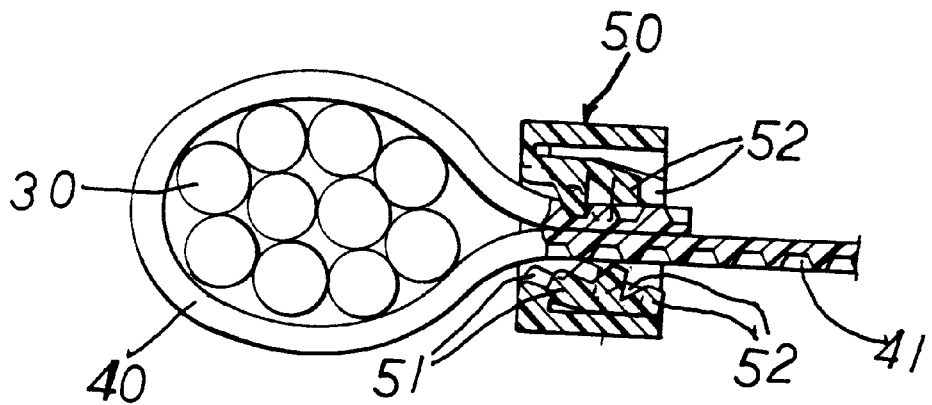
FIGS. 3 and 4 are partial cross sectional views illustrating the operation of the cable assembly.

Referring to the drawings, and initially to FIGS. 1–3, a cable assembly in accordance with the present invention is provided for use with a cable tying device and comprises a cable 40 including two or more rows of cavities 41 formed in one surface 42 thereof, such as formed in the bottom surface 42 thereof, and including an opposite surface 44, such as a flat upper surface 44. The two rows of cavities 41 are arranged in a stagger way relative to each other, and are defined by a number of ribs 48 respectively that are also arranged in a stagger way. The cable assembly includes one or more tie heads 50 each includes two or more pairs of ratchet catches 51 extended inward of a bore 58 of the tie head 50. The ratchet catches 51 each includes one or more teeth 52 arranged in a stagger way corresponding to that of the cavities 41 for engaging with the cavities 41 respectively.

Figure 4:
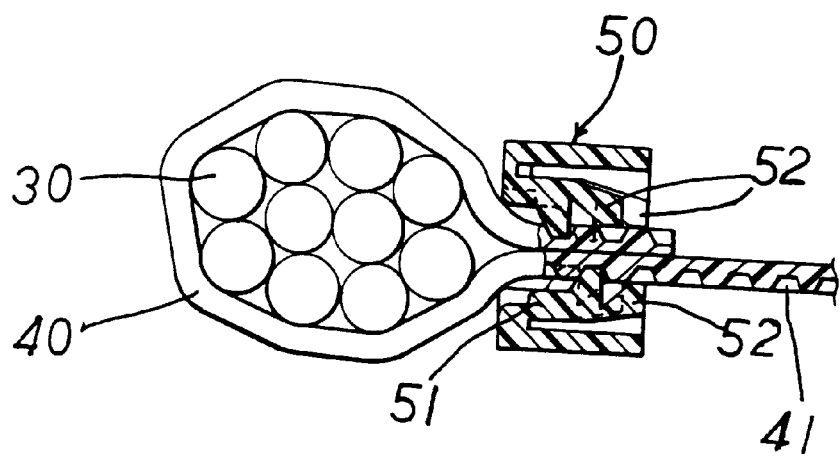

It is to be noted that, as best shown in FIGS. 3, 4, the two pairs of ratchet catches 51 each includes an upper and a lower ratchet catches 51, such that the pairs of ratchet catches 51 include a total of four ratchet catches 51, and such that the cable 40 will not be easily released or disengaged from the tie head 50 when one or two of the ratchet catches 51 are damaged or are not engaged with the cavities 41 of the cable 40. The cavities 41 may also be formed through the cable 40. As shown in FIG. 1, the tie head 50 may further include a guide channel 59 formed in a pair of inner side surfaces 57 for slidably receiving the sides or the edges of the cable 40 and for positioning the cable 40 relative to the tie head 50.

Accordingly, the improved cable assembly in accordance with the present invention includes a safety mechanism for preventing the cable from being easily disengaged from the tie head.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cable assembly for a cable tying device, said cable assembly comprising:

a cable including at least two rows of cavities formed therein, said at least two rows of cavities of said cable being arranged in a stagger way relative to each other said cable assembly not having a reinforcement rib formed between said at least two rows of cavities, and a tie bead including a bore formed therein and including at least two pairs of ratchet catches extended inward of said bore thereof, said at least two pairs of ratchet catches each having at least one tooth for engaging with said at least two rows of cavities of said cable and for securing said cable to said tie head, said at least two pairs of ratchet catches being arranged in a stagger way corresponding to said at least two rows of cavities of said cable for engaging with said at least two rows of cavities of said cable, said tie head including a guide channel formed therein for slidably receiving said cable and for positioning said cable relative to said tie head.

* * * * *